United States Patent
Erlingsson et al.

(10) Patent No.: US 7,870,336 B2
(45) Date of Patent: Jan. 11, 2011

(54) OPERATING SYSTEM PROTECTION AGAINST SIDE-CHANNEL ATTACKS ON SECRECY

(75) Inventors: Ulfar Erlingsson, San Francisco, CA (US); Martin Abadi, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 11/592,808

(22) Filed: Nov. 3, 2006

(65) Prior Publication Data

US 2008/0109625 A1    May 8, 2008

(51) Int. Cl.
*G06F 13/00* (2006.01)
(52) U.S. Cl. .................. 711/118; 711/111; 711/138; 711/152; 711/163; 712/244; 713/150
(58) Field of Classification Search ................ 711/152, 711/138, 118, 163
See application file for complete search history.

(56) References Cited

U.S. PATENT DOCUMENTS

| | | | | |
|---|---|---|---|---|
| 6,397,301 | B1 * | 5/2002 | Quach et al. | 711/138 |
| 6,523,141 | B1 | 2/2003 | Cantrill | 714/48 |
| 6,721,878 | B1 * | 4/2004 | Paul et al. | 712/244 |
| 6,724,894 | B1 | 4/2004 | Singer | 380/28 |
| 2004/0177263 | A1 | 9/2004 | Sobel et al. | 713/200 |
| 2004/0268365 | A1 | 12/2004 | Bray et al. | 719/318 |
| 2005/0166042 | A1 * | 7/2005 | Evans | 713/150 |
| 2005/0268336 | A1 | 12/2005 | Finnegan | 726/15 |
| 2006/0021033 | A1 | 1/2006 | Huynh et al. | 726/22 |
| 2006/0059309 | A1 * | 3/2006 | Harada | 711/118 |
| 2006/0090081 | A1 | 4/2006 | Baentsch et al. | 713/189 |
| 2006/0126849 | A1 | 6/2006 | Shirakawa et al. | 380/277 |
| 2006/0130060 | A1 | 6/2006 | Anderson et al. | 718/1 |
| 2007/0094442 | A1 * | 4/2007 | Ito et al. | 711/111 |

FOREIGN PATENT DOCUMENTS

WO    WO 0192981 A2    12/2001

OTHER PUBLICATIONS

King, S.T. et al., "SubVirt: Implementing Malware with Virtual Machines", IEEE Symposium on Security and Privacy, 2006, Oakland, California, May 21-24, 2006, 14 pages.
Ravi, S. et al., "Tamper Resistance Mechanisms for Secure Embedded Systems", Proceedings of the 17th International Conference on VLSI Design, 2004, 7 pages.
Witchel, E. et al., "Mondrian Memory Protection", ASPLOS-X, San Jose, California, Oct. 5-9, 2002, 13 pages.
"Cache coloring", Wikipedia, the free encyclopedia, page last modified on Aug. 29, 2006, page accessed on Nov. 3, 2006, 1 page.

* cited by examiner

*Primary Examiner*—Yong Choe
(74) *Attorney, Agent, or Firm*—Woodcock Washburn LLP (57) ABSTRACT

Unobservable memory regions, referred to as stealth memory regions, are allocated or otherwise provided to store data whose secrecy is to be protected. The stealth memory is prevented from exposing information about its usage pattern to an attacker or adversary. In particular, the usage patterns may not be deduced via the side-channels.

19 Claims, 9 Drawing Sheets

OPERATING SYSTEM PROTECTION AGAINST SIDE-CHANNEL ATTACKS ON SECRECY

BACKGROUND

An activity on a computer system may infer, discover, or have access to critical data pertaining to other activities on the system. The activity in question may be under the control of external malicious entities or users. An attacker may determine or discover critical data based on usage patterns and by monitoring the movement in and out of memory caches. These types of attacks depend on information being leaked through the timing behavior of memory systems that use caches. Such attacks are known as cache-effect side-channel attacks.

For example, an attack may be performed against AES (advanced encryption standard) encryption, in which an attacker executes code on a system to learn AES encryption keys used by others. An attacker may infer information regarding encryption by monitoring the memory that is accessed. Regarding substitution box tables, if an attacker can learn or infer what parts of the tables are used at a particular point in time, he may be able to infer the secrets, such as keys, behind the accessing of the tables.

Conventional protection against such memory monitoring attacks may be provided via operating systems, hypervisors, and any component that manages physical memory and page tables. However, the conventional solutions are complex, expensive, or require hardware changes.

SUMMARY

Unobservable memory regions, referred to as stealth memory regions for example, are allocated or otherwise provided, e.g., via programming interfaces, to store data whose secrecy is to be protected or is critical to a process. The stealth memory is prevented from exposing information about its usage pattern to an attacker or adversary, for example via side-channels.

Stealth memory may be implemented statically or dynamically or as a combination of the two. Static partitioning of stealth memory creates a fixed portion of memory that cannot be used except in a stealth context. Therefore, even if the stealth memory is not being used (e.g., no encryption is taking place), this fixed memory region is off-limits to other processes. Static partitioning can be temporal, spatial or a combination of the two, and, in addition to affecting the fixed memory, may also affect other aspects of memory and storage, such as shadows on cache linesets, described further below.

Instead of statically setting a region of memory to be stealth memory even when there is no present use for stealth memory, dynamic techniques may be implemented. In a dynamic technique, memory is not partitioned in a manner that supports stealth memory unless there is a present use for stealth memory. If no work or processing is being done that will use or access the memory in the stealth region, no support for stealth memory is established. Additionally, timeslices or interleaving may be used or exploited so that the same resource may be used for processes that use stealth memory and for processes that do not use stealth memory.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

The term cache line generally may refer to a unit of memory that can be transferred between a memory and a cache. Rather than reading a single word or byte from memory at a time, each cache entry usually holds a certain number of words, known as a "cache line", and a whole line is read and cached at once. In a system where caches are indexed with physical memory addresses, a pre-image of a cache line is the set of all physical memory addresses, and thereby a set of physical memory pages, that can map to a cache line. Similarly, in caches indexed with virtual memory addresses (possibly coupled with process ID tags), a pre-image of a cache line is the set of virtual memory addresses that can map to a cache line.

The term cache lineset refers to, for a K-way associative cache in which each address can be cached in any of K places, a set of K cache lines, all of which have the same pre-image. A shadow cache lineset of a physical address is the cache lineset that this physical address maps to. Shadow cache linesets of physical memory pages are the union of the shadows of the address in those physical pages. Shadows of virtual memory pages are the shadow cache linesets of the physical pages that those virtual memory pages map to.

To flush a cache lineset, in sequence, a set of K memory addresses with K distinct physical (or virtual) addresses that all map to the cache lineset is accessed, and the previous contents of the cache lineset, whatever they may be, are thereby evicted. Cache preloading of a memory region means that for a memory region, the value at each of the region's memory addresses is loaded into the cache lineset for that address.

Unobservable memory regions, referred to as stealth memory regions, are allocated or otherwise provided, e.g., via programming interfaces. Stealth memory may be implemented statically or dynamically or as a combination of the two. The stealth memory is prevented from exposing information about its usage pattern to unauthorized activity, such as an attacker or adversary. In particular, the usage pattern may not be deduced via side-channel attacks.

Figure 1:
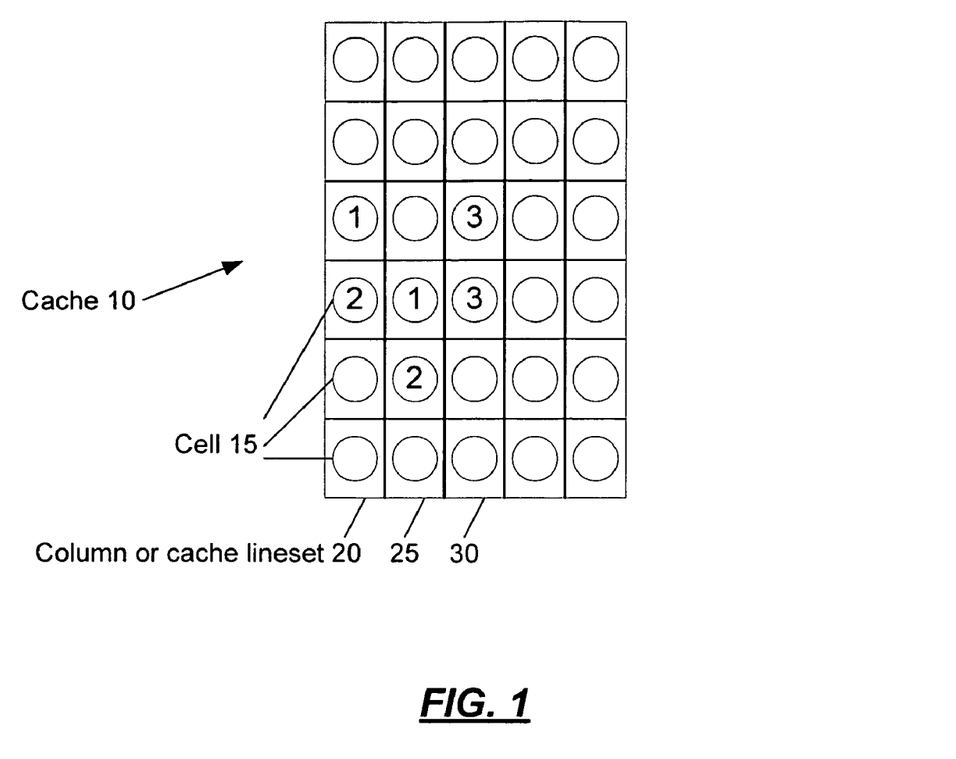
FIG. 1 is a diagram of an example storage region.

Regarding static partitioning, physical memory pages may be partitioned using a physical policy, such that a single stealth memory page is the only one using its cache lineset. FIG. 1 shows an example storage region. A cache 10, which is physical memory, comprises a plurality of cells 15, each of which is a cache line. A column of cells is a cache lineset. FIG. 1 includes example columns or cache linesets 20, 25, and 30.

Virtual memory pages may be disposed or allocated over more than one cache lineset. For example, virtual memories 1 and 2 are allocated over cache linesets 20 and 25 and represented in FIG. 1 as "1" and "2" in the cells of the cache linesets 20, 25. A memory to be protected is placed in a stealth region. Assuming memory 3 is desired to be protected, it is disposed in a stealth region, shown as comprising cache lineset 30. More particularly, the stealth region casts a shadow onto the cache lineset 30.

Memory 3 is considered to be the stealth memory. Regardless of the access to memories 1 and 2, nothing can be learned about memory 3 based on occupancy in cache linesets. This is because, for example, it can be arranged that any virtual memory allocated to processes by virtual memory managers do not cast a shadow onto the same cache lineset 30 as that of the stealth memory 3. Single page stealth memory regions may be used, as well as smaller, sub-page regions. Multi-page regions may also be used, and it may be desirable for them to be contiguous in physical memory.

Figure 2:
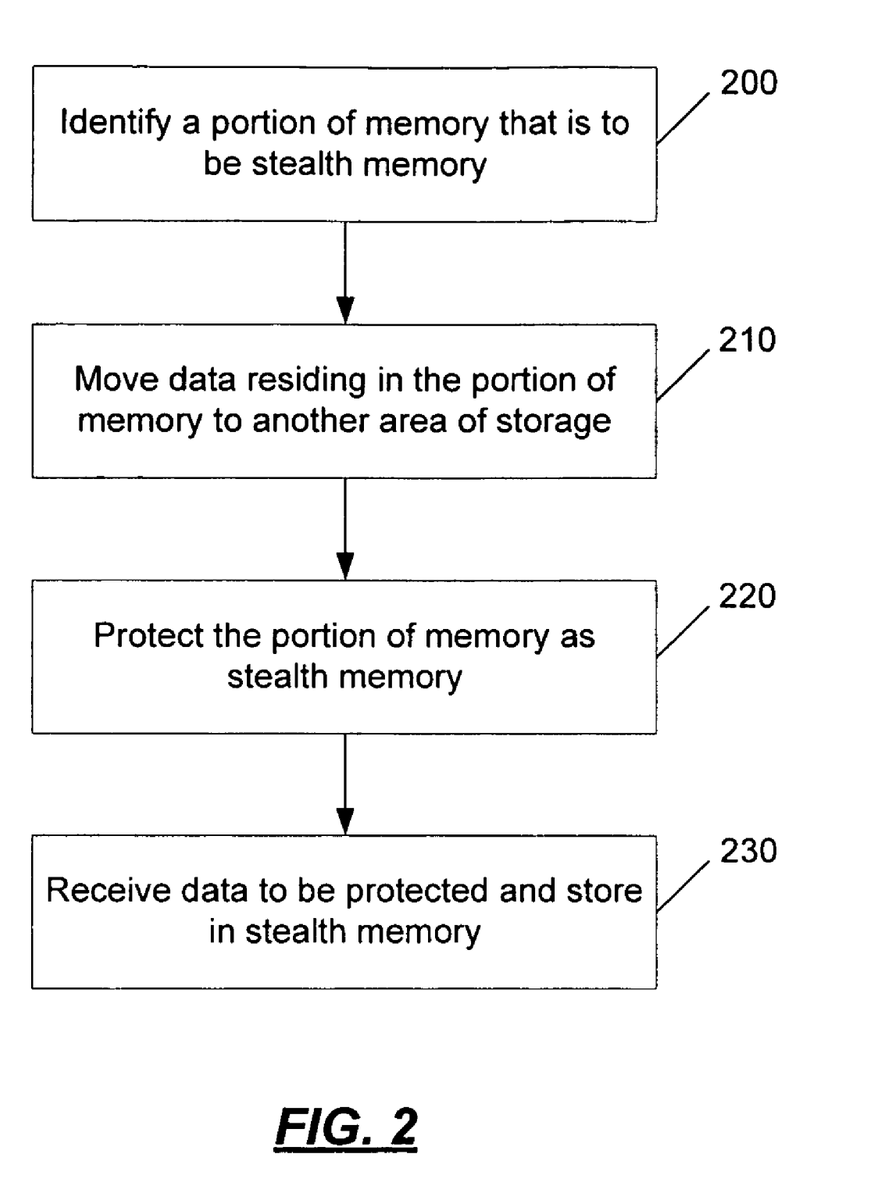
FIG. 2 is a flow diagram of an example method of establishing and using stealth memory.
Figure 3:
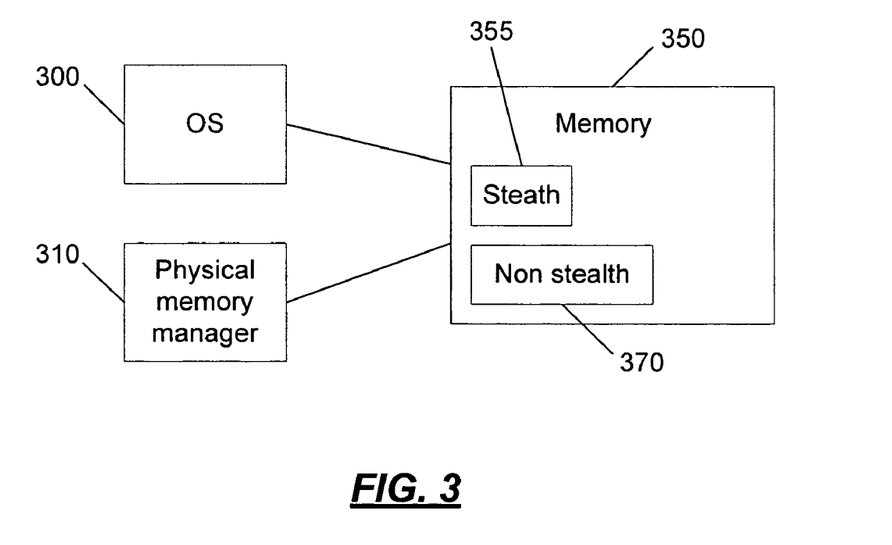
FIG. 3 is a diagram of an example system.

FIG. 2 is a flow diagram of an example method of establishing and using stealth memory in a static memory embodiment, and FIG. 3 is a corresponding system. At step 200, the operating system (OS) 300 or a physical memory manager 310, for example, identifies a portion of memory 355 in a larger memory 350 that is to be designated stealth memory. A physical memory page manager, a context switcher, and a page fault handler may be involved in the stealth memory allocation, partitioning, and monitoring. The portion of memory 355 that is to be stealth memory may be identified by physical addresses. The portion of memory is desirably a disjoint memory region, and may be one or more columns in a table or defined by cache lines and cache linesets, for example. Any memory region may be designated to be a stealth memory region.

Data that is already stored in physical pages that cast a shadow onto the column (cache lineset) intended for stealth memory is moved to other physical pages 370 of storage (changing the virtual page mappings so it is still at the virtual addresses), at step 210, thereby freeing up the column for stealth memory 355. The region of memory is then protected as stealth memory, at step 220. In this manner, stealth memory gets sole occupancy of a column. At step 230, data is received that is to be protected, and it is stored in the stealth memory. Subsequent access to the data is hidden from adversaries or attackers.

The existence of stealth memory makes a set of physical pages (the pre-image of the column) unusable for anything other than stealth memory in a static memory embodiment. More particularly, the fixed partitioning of the memory into a stealth memory region prevents certain cache linesets and certain physical memory pages (those in the stealth memory region) from ever being used by processes. Therefore, even if the stealth memory is not being used or is not planned to be used in the future (e.g., no encryption is taking place or planned), this stealth memory region is off-limits to other processes.

Instead of statically setting a region of memory to be stealth memory even when there is no present use or planned use for stealth memory, dynamic techniques may be implemented. In a dynamic technique, memory is not partitioned or designated as stealth memory unless there is a present use for stealth memory. If no work or processing is being done that will use or access the memory in the stealth region, no stealth memory is established or maintained.

Aspects of a dynamic stealth memory process may be implemented to occur during a timeslice or without timeslicing. Timeslicing, also referred to as interleaving, may be used in conjunction with a stealth memory process. In timeslicing, multiple processes or activities may use the same cache lineset in turn. For example, while an initial process that accesses stealth memory is using a cache lineset, other processes, regardless of whether they relate to stealth memory usage or not, wait their turn to use the cache lineset. At some points (e.g., based on an amount of time or a point in the process), the initial process releases its usage of the cache lineset, and another process or activity is then able to use the cache lineset. The availability and use of the cache lineset continues cycling through the various processes and activities that need or request it. These points may be determined automatically in operating systems with preemptive or cooperative scheduling.

Figure 4:
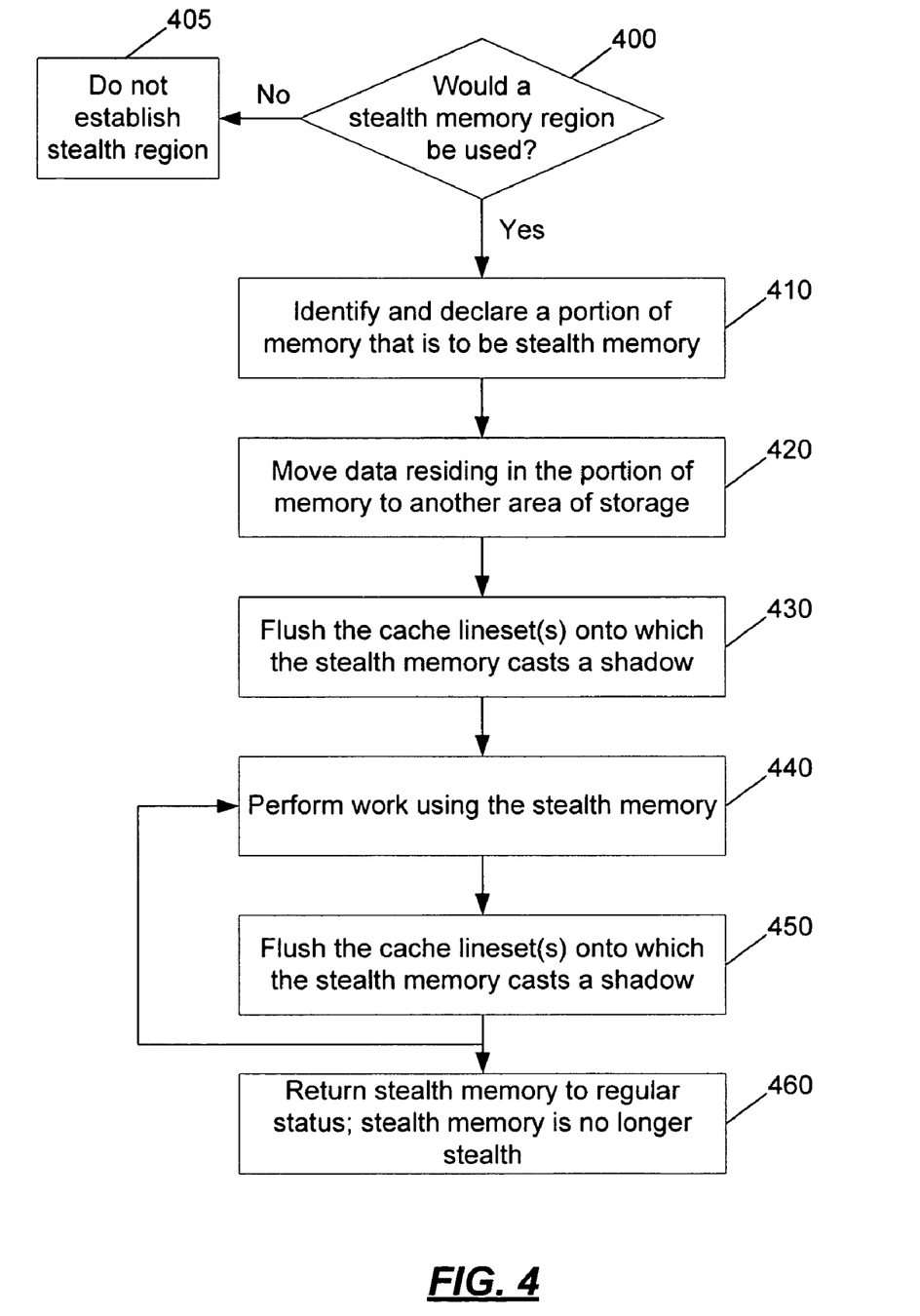
FIG. 4 is a flow diagram of an example dynamic stealth memory process.

FIG. 4 is a flow diagram of an example dynamic stealth memory process, and is first described without timeslicing details. Aspects of timeslicing in accordance with a dynamic stealth memory process are then described. At step 400, it is determined if a stealth memory region, if established, would be used. This determination may be made by checking which applications or processes are running, for example. If an encryption process is running or a process is running that uses encryption, then it is likely that a stealth memory region would be used. Conventional techniques may be used to determine if an encryption process is running or a process is running that uses encryption.

If a stealth region would not be used, then a stealth region is not established, and processing continues at step 405. Otherwise, a portion of memory that is to be a stealth region is identified and declared (e.g., using partitioning), at step 410. Any data that is already stored in the memory to be stealth memory may be moved to another area of storage, at step 420. Alternately or additionally, that portion of memory to be used as stealth is flushed, at step 430. For example, the cache linesets or columns in which the stealth memory will reside are emptied or otherwise erased.

At step 440, work is performed using the stealth region. Desirably, whenever data in the stealth memory is accessed, the stealth memory (e.g., the columns or cache linesets that were accessed) is flushed, at step 450. Steps 440 and 450 may be performed repeatedly, e.g., in a loop. Although an adversary may be able to determine that the columns or cache linesets were flushed, this information is not interesting or useful in terms of breaking encryption or determining other secrets. For example, all substitution box tables may be in the same stealth memory region, so what columns or cache linesets are flushed will not reveal which parts of the tables were accessed. The stealth region is then no longer considered stealth and may again be used in non-stealth processing, at step 460. For example, in a static case, activities may use physical pages in the same column or cache lineset, and in a dynamic case, flushing or preloading, described further below, may not be further implemented.

Thus, a dynamic scheme based on flushing, such as that described above with respect to FIG. 4, allows all physical memory and cache linesets in a memory to be used, as long as there is no need for a stealth region (e.g., as long as the process that uses or allocates the stealth memory is not run). This implementation would involve the memory manager and the context-switch code. For each process, the shadow cache lineset of all of its memory would be maintained. Then, if another process was scheduled that cast a shadow onto the stealth memory's cache lineset, the stealth memory's cache lineset would be flushed.

A cache lineset is a resource that can contain any values from the pre-image physical memory. Partitioning or flushing results in a cache lineset containing only values from physical memory that are under the control of authorized users (e.g., non-attackers). Flushing, as opposed to static partitioning, may take into consideration or otherwise support timeslices. Flushing allows other activity to make use of the resource between timeslices of activity that is using stealth memory. Thus, the resource (e.g., the cache lineset) may contain data useful to those other parties after they have been using the caches.

Note that flushing clears all information from cache linesets, even when the cache values therein are not used as part of the stealth memory. Therefore, it may be desirable to keep track of whether the stealth memory is being used, and avoid flushes unless the stealth memory had been used since the last flush. This can be achieved using page-table alerts to selectively choose when to flush the shadow cache lineset.

Figure 5:
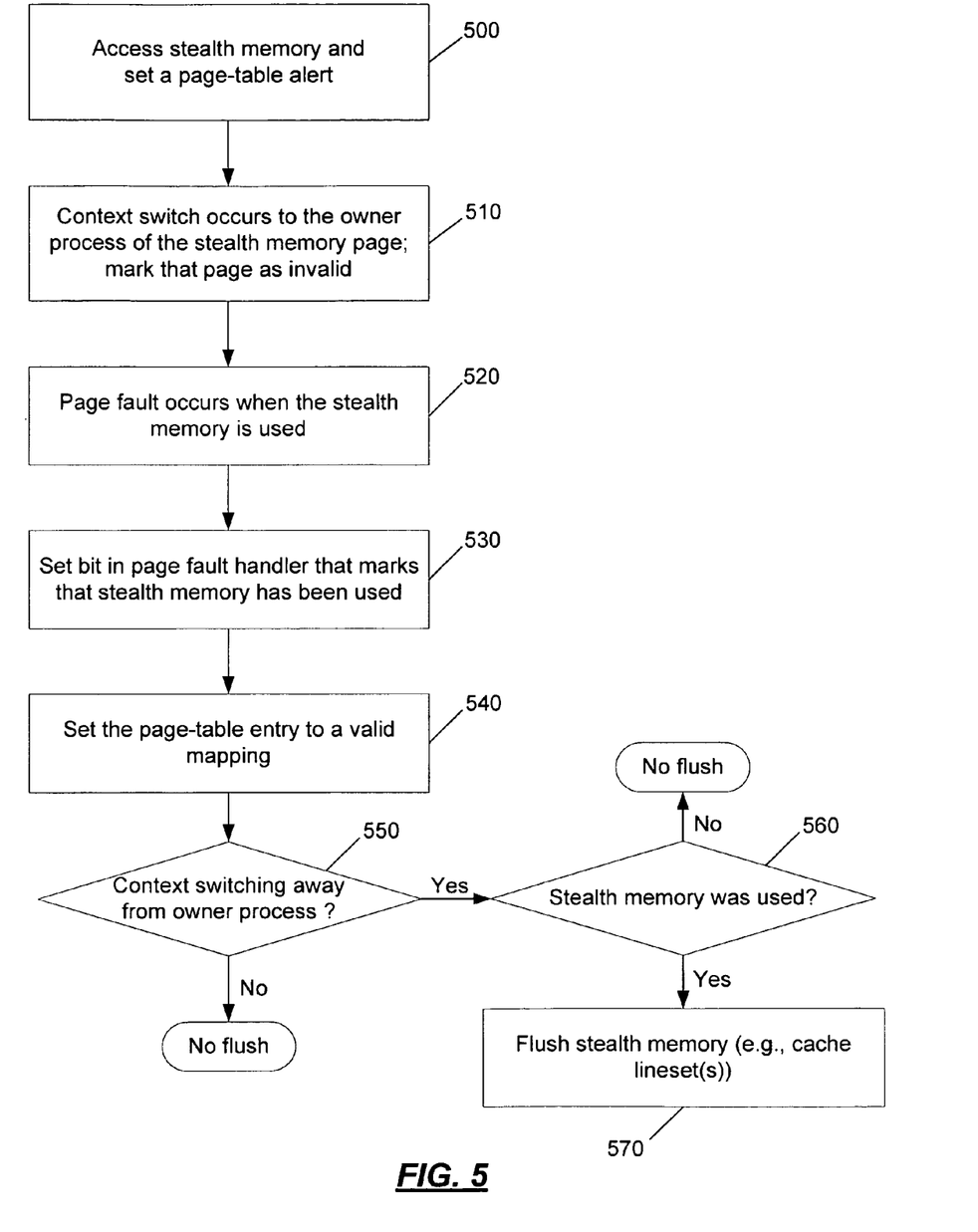
FIG. 5 is a flow diagram of an example method using a page-table alert.

FIG. 5 is a flow diagram of an example method using a page-table alert which may be implemented with timeslicing. At step 500, a byte in the stealth memory is accessed and a page-table alert is set. At step 510, a context switch, e.g. due to a timeslice change, takes place to the owner process of the stealth memory page, and that page is marked as invalid in the page tables. Then, at step 520, when the stealth memory is used, a page fault will occur.

In the page fault handler, at step 530, a bit is set that marks that the stealth memory has been used recently, and the page-table entry is set to be a valid mapping at step 540. At step 550, it is determined if context switching away from the owner process has occurred, and if so, at step 560, it is determined if the page-table alert indicates that the stealth memory has actually been used. If these conditions hold, then at step 570, a flush desirably takes place.

Figure 6:
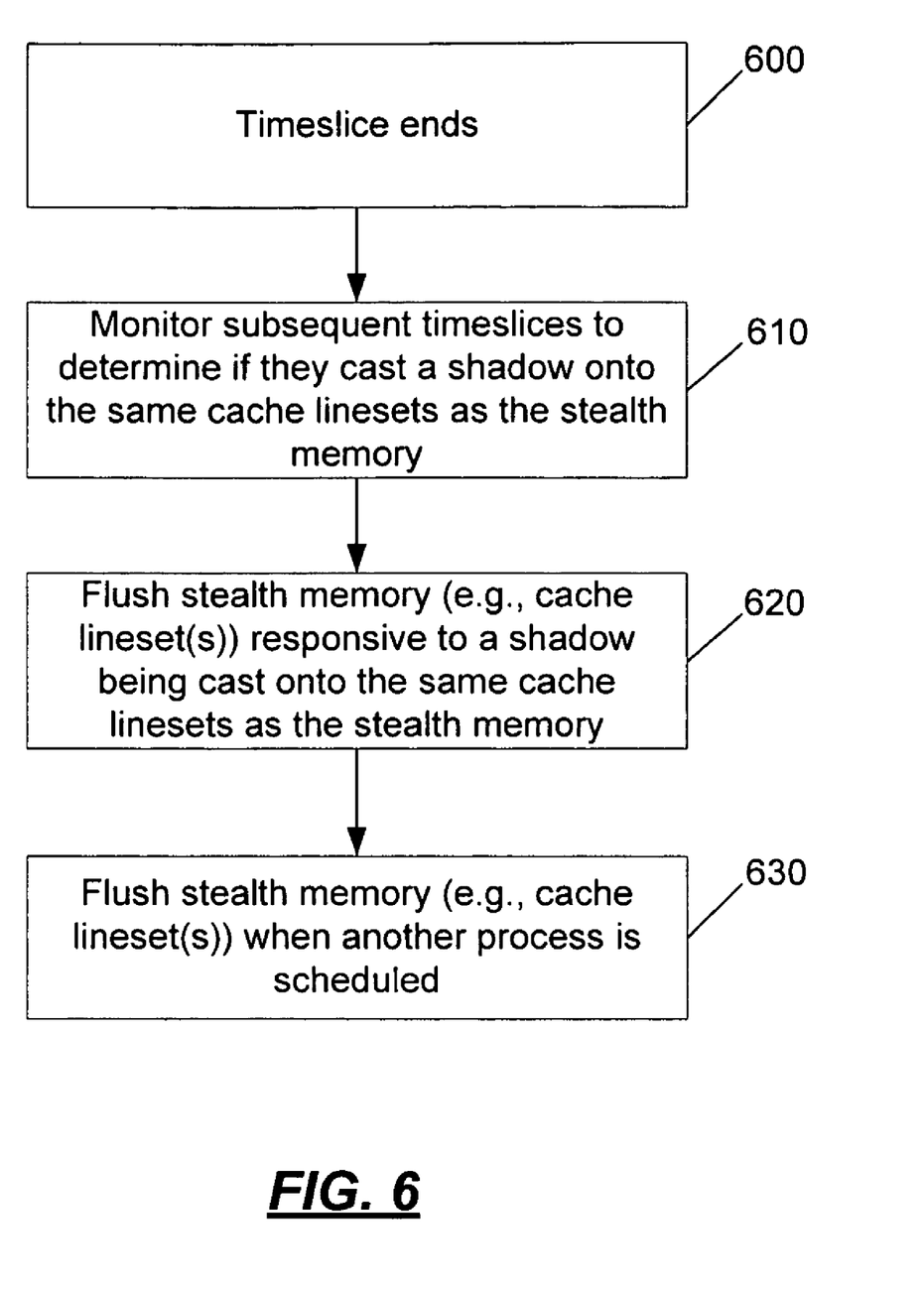
FIG. 6 is a flow diagram of an example flushing method.

Additionally, to avoid flushes, flushing may not be performed at the end of the owner process's context switch timeslice. FIG. 6 is a flow diagram of an example flushing method. After a timeslice ends at step 600, the processes in subsequent timeslices may be monitored, either statically or dynamically, at step 610 to determine if they cast a shadow onto the stealth memory's cache lineset. If so, then the cache lineset is flushed at step 620. Otherwise, flushes are not performed if such a shadow is never cast, or not cast until the owner process is scheduled again, at step 630. It is noted that flushes may not be desirable when such a shadow is cast by trusted processes in intermediary timeslices.

Figure 7:
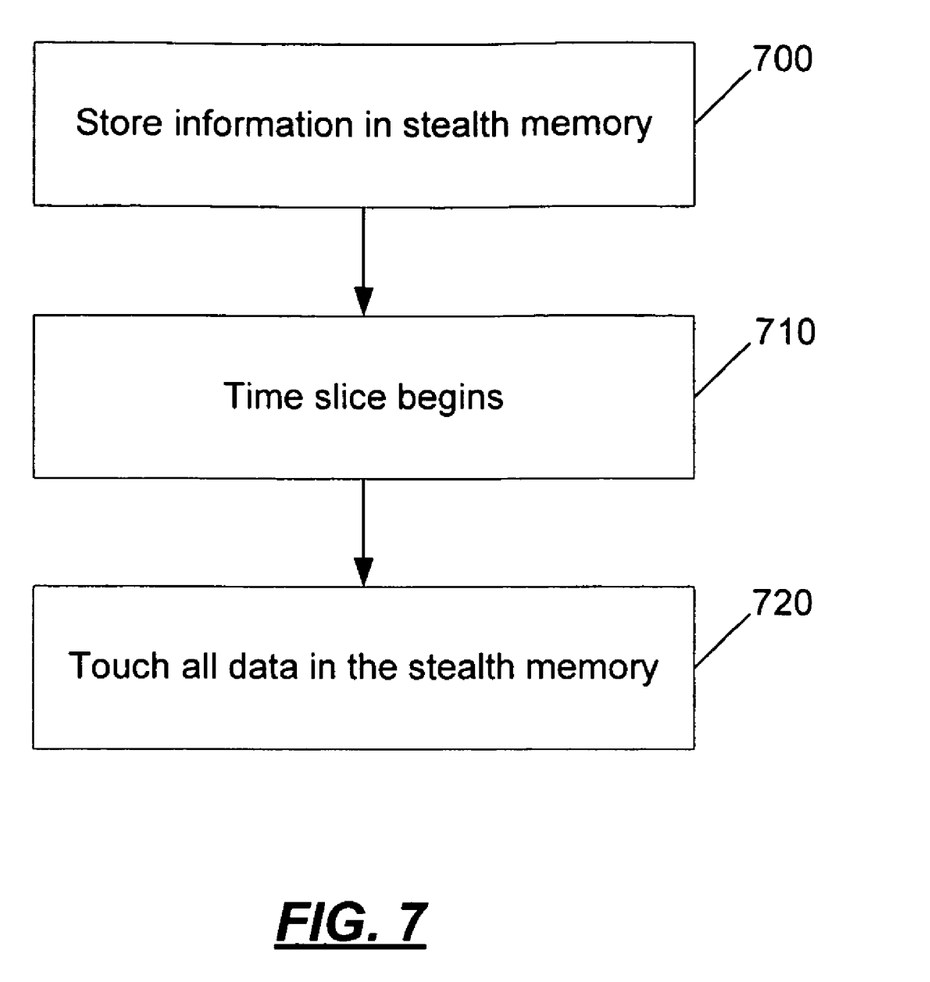
FIG. 7 is a flow diagram of an example method using cache preloading.

Flushing the stealth memory (e.g., the cache linesets or columns) may be undesirable, for example, because the stealth memory may contain some information that is desired to be retained. Accordingly, another technique may use cache preloading, as described with respect to FIG. 7. At step 700, information is stored in the stealth memory, and it is desired that adversaries are prevented from learning about the memory bytes that are being protected or about their use. A time slice begins at step 710. With cache preloading, at step 720, each entry in the stealth memory (e.g., the cells in the columns) is accessed or read, so that an adversary cannot learn what part of the stealth memory is used. This accessing or reading of the data desirably occurs before any of the data in the stealth memory is actually used.

Figure 8:
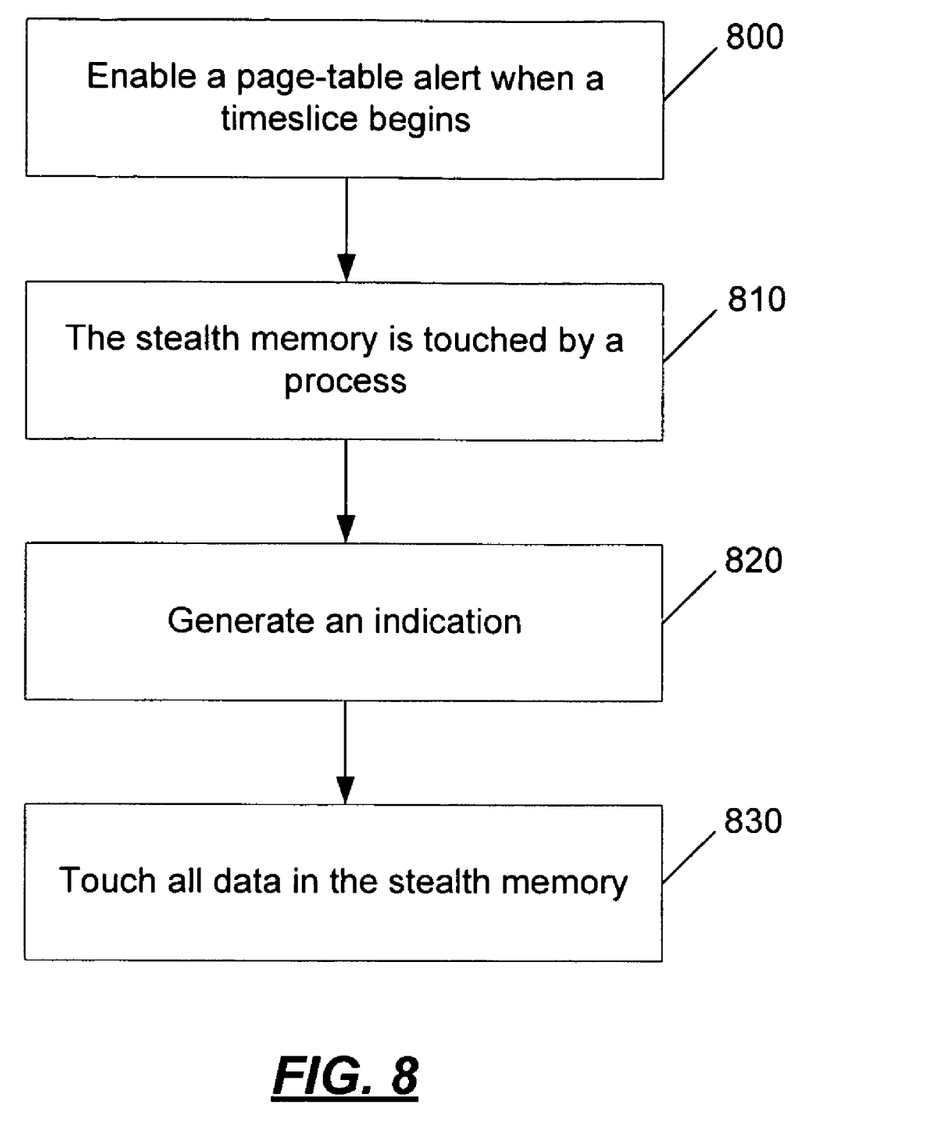
FIG. 8 is a flow diagram of an example method of using a page-table alert with cache preloading.

Page-table alerts can be combined with cache preloading such that page-table alerts trigger cache preloading of the stealth memory. An example method of using a page-table alert with cache preloading is described with respect to FIG. 8. At step 800, a page-table alert is enabled when a timeslice begins. At step 810, a process that is allowed to do so accesses or reads the stealth memory. The page-table alert then provides an indication at step 820, and the entire stealth memory is accessed or read at step 830, making it resident in cache lines of its shadow cache lineset. Thus, when a page-table alert is indicated, the columns or cache linesets are not flushed, but instead each entry in the stealth memory is accessed or read. Flushing or fixed partitioning is not used, and cache linesets may be safely shared.

Combining page-table alerts with cache preloading prevents an adversary from learning information from partial fills/retention in that cache lineset. Also, this preloading will prevent certain timing attacks, such as those used for the table lookups of AES. Table lookups depend directly on a key, and therefore the key can be determined from the order and indices of the lookups. In particular, it may be necessary for an adversary to determine that an encryption method using shadow memory does not simultaneously use other memory that causes contention for the stealth memory's shadow cache lineset.

For systems with multiple levels of memory hierarchy, different techniques could be used at different levels. For instance, stealth memory might never be paged out to disk. Alternatively, the top-level cache might always be flushed after a context slice has used stealth memory.

When a stealth memory region is requested, the operating system may move data around with respect to the existing virtual-to-physical mappings of processes. This may be useful for performance, and desirable for security, if a fixed partitioning of cache linesets is being implemented.

Also, it may be desirable to avoid the potential of untrusted memory pages casting a shadow onto the stealth memory's cache lineset. This can be achieved by partitioning non-stealth memory into untrusted and trusted portions, and allocating physical pages for trusted non-stealth memory out of the pre-image of the stealth memory's cache lineset. Trusted memory could be the memory of the process that created the stealth memory, or the memory of all processes running as the same principal.

These techniques may also apply to information leakage via the branch-prediction caches and resource (e.g., ALU (arithmetic and logic unit)) usage on certain systems, e.g., hyperthreaded systems. Branch prediction caches are caches internal to a CPU, and record whether or not branches are taken. An adversary may try to read this branch information to learn or deduce secret data. Decompression is an example of an activity that could leak information about the data being used through the branch-prediction caches.

The ideas of partitioning the shadow cache linesets, whether statically or dynamically, can also be useful to other side channels subject to timing attacks, such as those exposed by microarchitectural features such as opportunistic priorities in store/load queues and cache-bank latency variations in L1 caches.

Stealth memory techniques may be used on traditional computers (a single CPU with some caches, timesliced, by an OS or virtual memory manager, for example) or for multi-core and hyperthreaded systems that use shared caches. For systems that use shared caches, the OS or virtual memory manager may look at what processes are running on each context slice, or whenever stealth memory use is signaled via a page-table alert. An exclusion policy may be implemented using an incompatibility notion between processes that removes certain activity from cores when another activity is occurring that uses stealth memory. Static means may also be used to avoid having any untrusted memory pages cast a shadow onto the stealth memory's cache lineset.

Partitioning can be done dynamically at the time of stealth memory page-table alert. The CPU getting the alert can ask other CPUs to relocate physical memory of their currently running process so that it does not cast a shadow onto the stealth memory's cache linesets. This could be done partially, just on the working set, for example, to increase performance.

Figure 9:
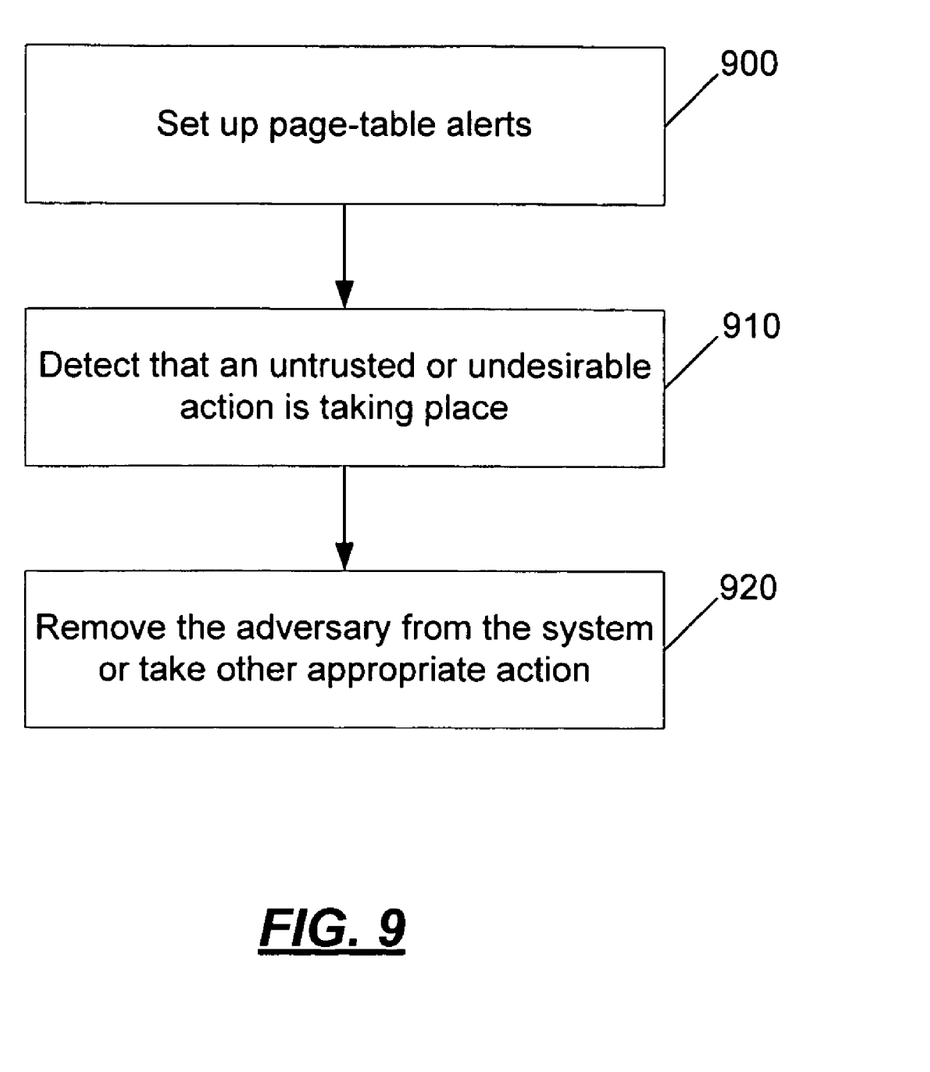
FIG. 9 shows a flow diagram of an example technique using translation look-aside buffers (TLBs).

Such relocation could also be done fully dynamically by using a TLB (translation look-aside buffer) technique. A TLB is a table used in a virtual memory system that lists the physical address page number associated with each virtual address page number. A TLB is used in conjunction with a cache whose tags are based on virtual addresses. FIG. 9 shows a flow diagram of an example technique using TLBs. At step 900, page-table alerts are set up for certain actions in the system. When it is determined that an untrusted or other undesirable action is taking place, at step 910, the adversary is removed from the system or other action is taken to slow the adversary's system down, at step 920.

By having the untrusted process's CPU flush its TLBs (which are per processor (i.e., CPU)), whether multicore or hyperthreaded), one could guarantee that a "possible conflict alert" would be indicated whenever the untrusted process might be observing cache effects related to the stealth memory. Then, upon such alerts, a range of options is possible: the OS could remove or eliminate the process, do the memory access for it in a constant-time, super-slow manner, or it could re-map to a different underlying physical page to enforce a partitioning, for example.

Different strategies will most likely be desirable for different hardware systems: single core (no concurrent cache sharing), multi core (concurrently shared L2 caches), and hyperthreading (all caches concurrently shared). The solutions will range, e.g., from cache preloading, with its minimal performance effects, to static partitioning and its larger performance effect.

The desired effect of using stealth memory page-table alerts is to make protection be low or zero cost whenever stealth memory is not being used, and only incur slowdown for the fraction of the systems activity that might possibly leak information over the side channel. In particular, dynamic relocation using the above TLB techniques can be done without touching the memory manager at all.

Although encryption is described as an activity that may be protected by the use of stealth memory, any information, activities, and memory regions may be protected by, and use, stealth memory.

An example API to implement stealth memory is void* pointer=AllocateStealthMemory(size_in_bytes). Alternatively, stealth memory might be requested for an identified separate section of binary executable files, and may be created at the time of loading those binaries. Thus, the static tables of AES, for example, might be static, read-only "global data" in the source-code and resulting binary, and yet be placed in stealth memory when the binary is loaded. The stealth section of the binary could be backed by the same physical pages for the processes that load that binary. When supporting such APIs on layered software systems—such as when interpreters run inside applications, virtual machines run on top of operating systems, or operating systems run on top of hypervisors—the information contained in these APIs would desirably be conveyed from higher layers to lower layers, all the way to the lowest layer that is responsible for controlling physical and virtual memory management.

Although one stealth memory region is described, multiple stealth memory regions may be used concurrently, and an access control policy would desirably be applied to them to allow for maximal sharing/performance as well as security. Thus, for example, all the critical operating system security data could be stored in a single stealth memory region. Alternatively, the granularity could be that of processes, with all of their memory either being stealth or not, for example.

When multiple types of stealth memory regions are used, an example API could be void* pointer=AllocateStealthMemory(size_in_bytes, ID), where ID is the name of a distinct type of stealth memory. Example types of stealth memory include tables for encryption operations or for encryption-related arithmetic, and dictionaries of sensitive information. The API could take as extra arguments other information, such as the dynamic principal invoking the API. The policy for identifiers could be implemented at runtime through an access control system. For example, the OS or the virtual memory manager may keep an access control matrix that identifies which processes can request stealth regions of which identifiers or types, and what IDs have already been allocated to each. As a result, IDs may be shared safely by processes; for instance, all trusted OS processes may use the same ID, while other processes may not be allowed to use this ID.

Exemplary Computing Arrangement

Figure 10:
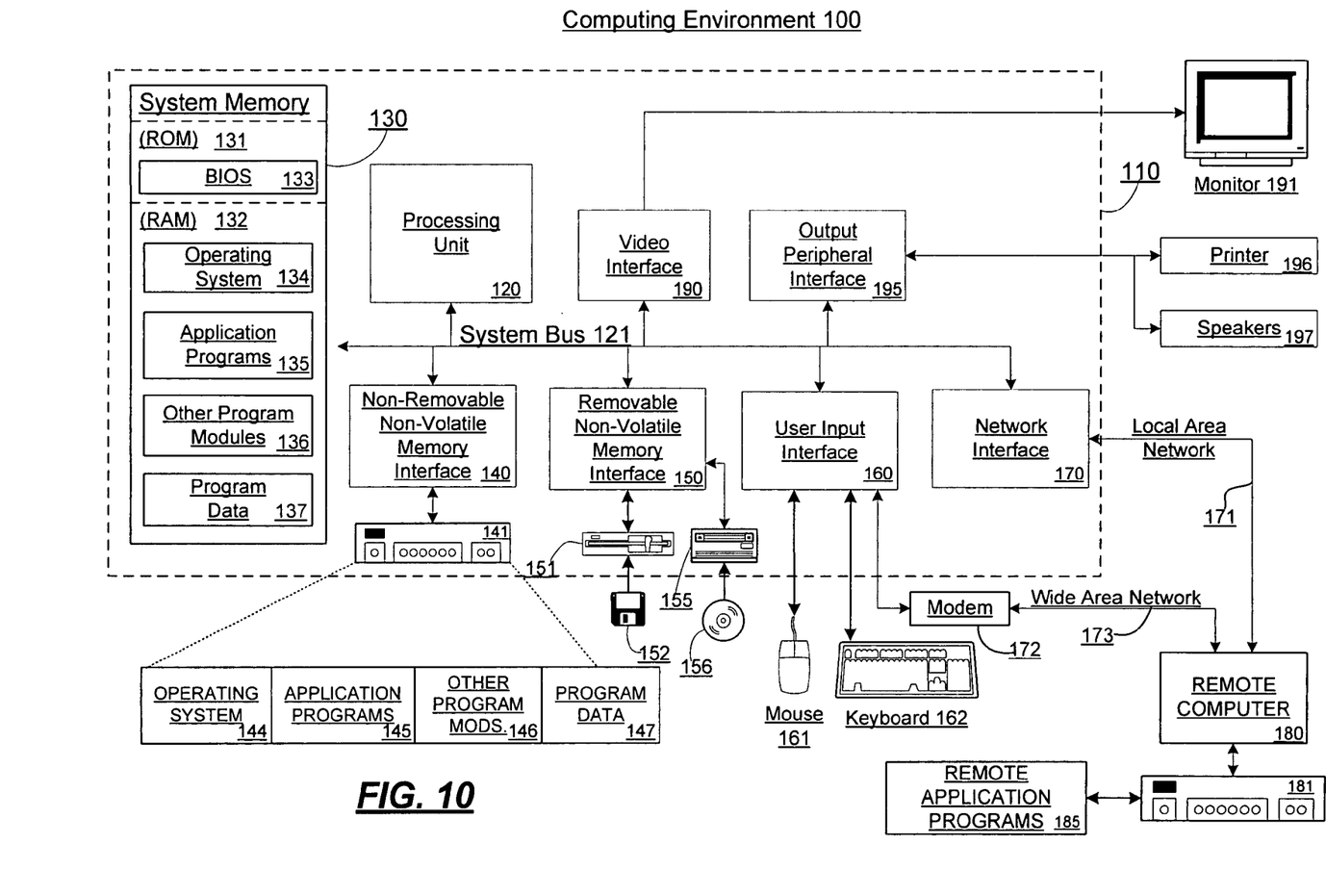
FIG. 10 is a block diagram of an example computing environment in which example embodiments and aspects may be implemented.

FIG. 10 shows an exemplary computing environment in which example embodiments and aspects may be implemented. The computing system environment 100 is only one example of a suitable computing environment and is not intended to suggest any limitation as to the scope of use or functionality. Neither should the computing environment 100 be interpreted as having any dependency or requirement relating to any one or combination of components illustrated in the exemplary operating environment 100.

Numerous other general purpose or special purpose computing system environments or configurations may be used. Examples of well known computing systems, environments, and/or configurations that may be suitable for use include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 10, an exemplary system includes a general purpose computing device in the form of a computer 110. Components of computer 110 may include, but are not limited to, a processing unit 120, a system memory 130, and a system bus 121 that couples various system components including the system memory to the processing unit 120. Caches may be present in the processing unit 120, for example, as well as in additional components of computer 110. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 10 illustrates operating system 134, application programs 135, other program modules 136, and program data 137.

The computer 110 may also include other removable/non-removable, volatile/nonvolatile computer storage media. By way of example only, FIG. 10 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 10, provide storage of computer readable instructions, data structures, program modules and other data for the computer 110. In FIG. 10, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 10. The logical connections depicted in FIG. 10 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 10 illustrates remote application programs 185 as residing on memory device 181. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of protecting data, comprising:
   providing a stealth memory by defining a first column of memory cells in a cache memory as a cache lineset, wherein each of the memory cells in the first column is configured to operate as a cache line;
   configuring the cache memory such that the first column of memory cells provides occupancy solely to the stealth memory;
   implementing a memory partitioning policy that prevents untrusted memory pages from casting a shadow onto the first column of memory cells; and
   running a stealth memory process that accesses data in the stealth memory while providing protection against cache-effect side-channel attacks.

2. The method of claim 1, further comprising:
   setting a page-table alert upon accessing data in the stealth memory;
   using the page-table alert for determining when to flush the cache lineset; and
   flushing the cache lineset pursuant to a predetermined condition, the predetermined condition defined at least in part, by the page-table alert.

3. The method of claim 2, wherein the predetermined condition is further defined by at least one of: a) the conclusion of a timeslice or b) casting of a shadow onto the cache lineset by a subsequent process, after termination of a timeslice used by a trusted process.

4. The method of claim 1, wherein the cache lineset is mapped from a set of memory addresses.

5. The method of claim 4, wherein the memory addresses are virtual memory addresses.

6. A method of protecting data, comprising:
   designating a portion of memory as a cache area;
   defining a first column of memory cells in the cache area as a cache lineset;
   configuring each of the memory cells in the first column to operate as a cache line;
   configuring the first column of memory cells to operate exclusively as a stealth memory; and
   protecting the stealth memory against cache-effect side-channel attacks by making the stealth memory unobservable, wherein making the stealth memory unobservable comprises implementing a memory partitioning policy that prevents an untrusted process from casting a shadow onto the first column of memory cells.

7. The method of claim 6, further comprising:
   designating a second column adjacent to the first column in the cache area as a cache area for a non-stealth process.

8. The method of claim 7, wherein the non-stealth process is an untrusted process.

9. The method of claim 6, wherein the stealth memory is designated from a portion of virtual memory.

10. The method of claim 6, wherein:
    the cache area is defined as a K-way associative cache having a set of addresses that are cached in K disjointed memory locations.

11. The method of claim 10, wherein the stealth memory is mapped to a shadow cache lineset.

12. The method of claim 11, wherein the set of addresses are physical addresses.

13. The method of claim 11, wherein the shadow cache lineset is a physical memory page formed from a union of shadows of addresses.

14. The method of claim 6, further comprising moving data from the first column of memory cells to another portion of memory prior to using the stealth memory.

15. The method of claim 6, further comprising determining that there is a present use for the stealth memory prior to performing an activity to protect the portion of memory as stealth memory, and otherwise failing to perform the activity.

16. The method of claim 15, wherein determining that there is a present use for the stealth memory comprises determining that an encryption process is running, that an encryption process is about to run, or that a process that uses encryption is running.

17. The method of claim 6, further comprising, flushing the cache lineset after use of the stealth memory.

18. The method of claim 6, further comprising determining that the untrusted process may be in a situation to learn secrets and taking an action against the untrusted process, wherein the determination considers the status of at least one page-table alert.

19. The method of claim 18, wherein the action comprises relocating the untrusted process activity to another processor, suspending the activity of the untrusted process until a later time, or performing on behalf of the untrusted process in constant, fixed time operations such as memory accesses.

* * * * *